US012601416B2

(12) United States Patent
Till et al.

(10) Patent No.: US 12,601,416 B2
(45) Date of Patent: Apr. 14, 2026

(54) FLUID DISPENSING ELEMENT, CONTROL VALVE AND DISPENSING CONNECTOR CONSTITUTING SAID ELEMENT

(71) Applicant: A. Raymond et cie, Grenoble (FR)

(72) Inventors: Ruffing Till, Baden-Württemberg (DE);
Urs Grether, Württenberg (DE)

(73) Assignee: A. Raymond et Cie, Grenoble (FR)

( * ) Notice: Subject to any disclaimer, the term of this patent is extended or adjusted under 35 U.S.C. 154(b) by 6 days.

(21) Appl. No.: 18/245,276

(22) PCT Filed: Sep. 7, 2021

(86) PCT No.: PCT/FR2021/051535
§ 371 (c)(1),
(2) Date: Mar. 14, 2023

(87) PCT Pub. No.: WO2022/074308
PCT Pub. Date: Apr. 14, 2022

(65) Prior Publication Data
US 2023/0366479 A1 Nov. 16, 2023

(30) Foreign Application Priority Data
Oct. 7, 2020 (FR) ...................................... 2010227

(51) Int. Cl.
*F16K 27/02* (2006.01)
*F16K 31/06* (2006.01)
(52) U.S. Cl.
CPC ...... *F16K 27/0236* (2013.01); *F16K 31/0655* (2013.01)

(58) Field of Classification Search
CPC ... F16K 27/02; F16K 27/0236; F16K 31/0655
See application file for complete search history.

(56) References Cited

U.S. PATENT DOCUMENTS

| | | | |
|---|---|---|---|
| 2003/0042459 A1 | 3/2003 | Gregoire | |
| 2018/0031141 A1 | 2/2018 | Ye et al. | |
| 2018/0094740 A1 | 4/2018 | Aoyama | |

FOREIGN PATENT DOCUMENTS

| | | |
|---|---|---|
| DE | 8210413 | 1/1986 |
| DE | 8802557 | 6/1988 |
| DE | 102014220032 | 4/2016 |

(Continued)

OTHER PUBLICATIONS

French Search Report for Application No. 2010227 dated Jun. 15, 2021, 2 pages.

(Continued)

*Primary Examiner* — Paul J Gray
(74) *Attorney, Agent, or Firm* — TraskBritt

(57) ABSTRACT

An element for dispensing fluid comprises a control valve and a connector for dispensing the fluid from at least one inlet line to an outlet line. The control valve comprises an inlet passage and a tubular fluid outlet duct. A chamber of the dispensing connector has a main opening traversed by the inlet passage and the tubular fluid outlet duct of the valve, a bottom that faces the main opening, a wall extending from the bottom of the chamber to the main opening, at least one inlet opening formed in the wall of the chamber so as to provide access to the inlet line, and an outlet opening formed in the bottom of the chamber and connecting one end of the tubular outlet duct to the outlet line of the connector.

20 Claims, 4 Drawing Sheets

(56)         References Cited

FOREIGN PATENT DOCUMENTS

| | | | |
|---|---|---|---|
| FR | 2699673 | A1 | 6/1994 |
| WO | 2018/188823 | A1 | 10/2018 |
| WO | 2019/029915 | A1 | 2/2019 |
| WO | 2020/018188 | A1 | 1/2020 |
| WO | 2020/019029 | A1 | 1/2020 |

OTHER PUBLICATIONS

International Search Report for Application No. PCT/FR2021/051535 dated Nov. 22, 2021, 2 pages.
International Written Opinion for Application No. PCT/FR2021/051535 dated Nov. 22, 2021, 6 pages.
German Examination Report for Application No. 112021005308.6 dated Nov. 21, 2024, 10 pages.

FLUID DISPENSING ELEMENT, CONTROL VALVE AND DISPENSING CONNECTOR CONSTITUTING SAID ELEMENT

CROSS-REFERENCE TO RELATED APPLICATIONS

This application is a national phase entry under 35 U.S.C. § 371 of International Patent Application PCT/FR2021/051535, filed Sep. 7, 2021, designating the United States of America and published as International Patent Publication WO 2022/074308 A1 on Apr. 14, 2022, which claims the benefit under Article 8 of the Patent Cooperation Treaty to French Patent Application Serial No. FR2010227, filed Oct. 7, 2020.

TECHNICAL FIELD

The present disclosure is applicable within the scope of cleaning devices and systems available in certain vehicles. More specifically, the disclosure falls within the field of the distribution of fluids (a liquid and/or compressed air) that may be used in vehicles to clean, by projection, useful surfaces such as the optics of cameras or headlights, sensitive sensor surfaces, or other types of surface.

BACKGROUND

Documents WO2018188823 and WO2019029915 propose different configurations of lines for distributing a fluid in a vehicle, the fluid being intended to supply a plurality of ejection nozzles. The distribution line is equipped with a plurality of valves, each being associated with a nozzle and electrically set to an open or closed state by a control unit so as to supply the nozzle or, alternatively, to block the supply of fluid to the nozzle.

More generally, the installation of a fluid distribution line in a vehicle uses a wide variety of elements that enable the fluid to be distributed: control valve, connectors, ducts, nozzles, etc. As modern vehicles use an increasing number of components requiring fluid supply, the number of distribution elements required is also tending to increase. The constraints of weight, space, and maintenance needs make conventional distribution elements undesirable and impractical.

Document US2003/042459 discloses a valve body on which a connector is attached by screwing. A diaphragm makes it possible to selectively circulate a fluid from an inlet of the connector to an outlet of the connector. The insertion or removal of such a device in a fluid distribution line is not very simple. It requires either dislocating the ducts forming the inlet and outlet lines of the connector, or unscrewing the valve body from the connector, which is impractical in either case, especially in the confined space of a vehicle.

BRIEF SUMMARY

According to a first aspect, an object of the present disclosure is to provide an element for distributing a fluid comprising:

a. a control valve formed by a valve head closing a valve body:

the valve head defining a fluid inlet duct and a tubular fluid outlet duct, the inlet passage and the tubular outlet duct, respectively, having ends that open into an enclosure of the valve body; and the valve body comprising a plug that is disposed in the enclosure, the plug being controlled so as to selectively close and open the outlet end of the tubular outlet duct; and b. a connector for distributing the fluid from at least one inlet channel to an outlet channel, the connector being attached to the valve head and comprising a main body that defines a chamber, the chamber having:

a main opening that is traversed by the fluid inlet passage and the tubular fluid outlet duct of the valve head;

a bottom that faces the main opening;

a wall extending from the bottom of the chamber to the main opening;

at least one inlet opening that is formed in the wall of the chamber in order to provide access to the inlet channel; and an outlet opening that is formed in the bottom of the chamber and connects one end of the tubular outlet duct to the outlet channel of the connector.

According to other advantageous and non-limiting features of the present disclosure, taken alone or in any technically feasible combination:

the tubular fluid outlet duct is disposed in the inlet passage;

the inlet passage is formed by a duct disposed next to the tubular outlet duct;

the distribution connector comprises a first seal disposed in the chamber to seal the connection between the distribution connector and the control valve;

the internal wall of the chamber comprises, on the side of the bottom of the chamber, a groove in which a second seal resides, providing a tight connection between the tubular outlet duct and the outlet opening;

the distribution connector comprises two inlet openings;

the inlet opening and the outlet opening of the distribution connector open into two sections of duct, respectively, the free ends of which respectively define the inlet channel and the outlet channel of the distribution connector; and the connector comprises means for securing to the valve head.

According to another aspect, an object of the present disclosure is to provide a control valve that is designed to be attached to a fluid distribution connector, the connector being attached in an assembly direction to the control valve, the control valve comprising:

a valve head defining a fluid inlet passage, a tubular fluid outlet duct, the inlet passage and the tubular outlet duct, respectively, having ends that open into an enclosure of the valve body; and a plug that is disposed in the enclosure, the plug being controlled so as to selectively close and open the outlet end of the tubular outlet duct.

According to the disclosure, the valve head closes the valve body and the tubular outlet duct extends from the enclosure to a free end in the direction of assembly, the tubular outlet duct being disposed in or next to the inlet passage.

According to yet another aspect, an object of the present disclosure is to provide a connector for distributing a fluid from at least one inlet channel to one outlet channel and designed to be attached to a control valve having a fluid inlet passage and a tubular fluid outlet duct, the connector comprising a main body that defines a chamber, the chamber having:

a main opening for receiving the fluid inlet passage and the tubular fluid outlet duct from the valve when the connector is attached to the valve;

a bottom that faces the main opening;

a wall extending from the bottom of the chamber to the main opening;

at least one inlet opening that is formed in the wall of the chamber in order to provide access to the inlet channel; and an outlet opening that is formed in the bottom of the chamber in order to connect one end of the tubular outlet duct to the outlet channel of the connector, when the connector is attached to the valve.

BRIEF DESCRIPTION OF THE DRAWINGS

Further features and advantages of the present disclosure will become apparent from the following detailed description of example embodiments of the present disclosure, with reference to the appended figures, in which.

DETAILED DESCRIPTION

Figure 1:
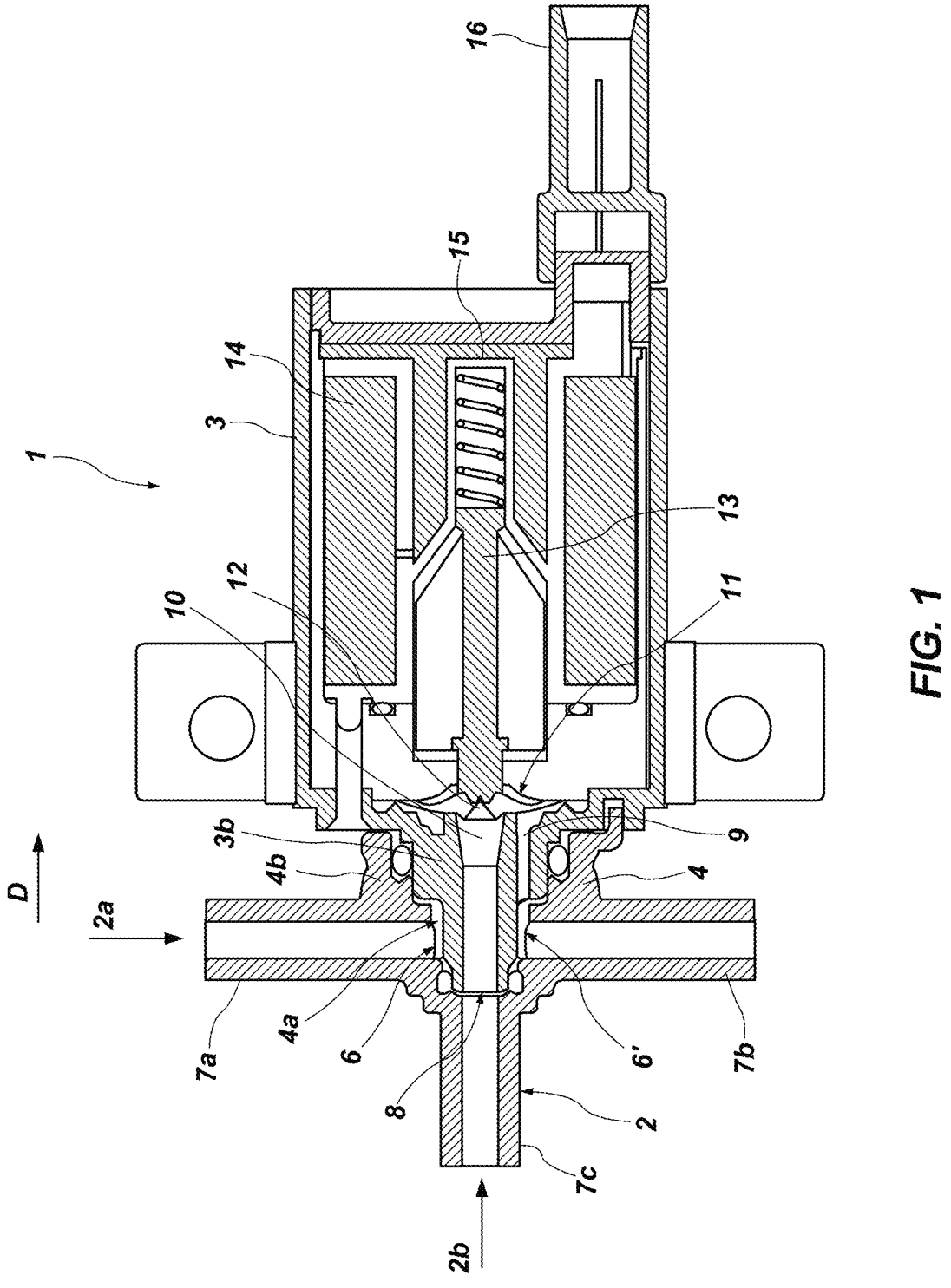
FIG. 1 shows a sectional view of a first example of a fluid distribution element according to the present disclosure.

FIG. 1 shows a view of a first example of a fluid distribution element 1 according to the present disclosure.

This element 1 is formed by a distribution connector 2 that is attached to a control valve 3. The fluid distribution element 1 is able to selectively allow the fluid to flow from a first duct of a fluid distribution line toward a second duct of this line. For illustration purposes only, the distribution line can be disposed in a vehicle, as was indicated in the introduction to this application, and the fluid can be a liquid, such as water, or a gas, such as compressed air.

In order to enable the fluid distribution element 1 to function, the connector is provided with an inlet channel 2a that is designed to be fluidly connected to the first duct of the distribution line and an outlet channel 2b that is designed to be fluidly connected to the second duct of the line.

Figure 2:
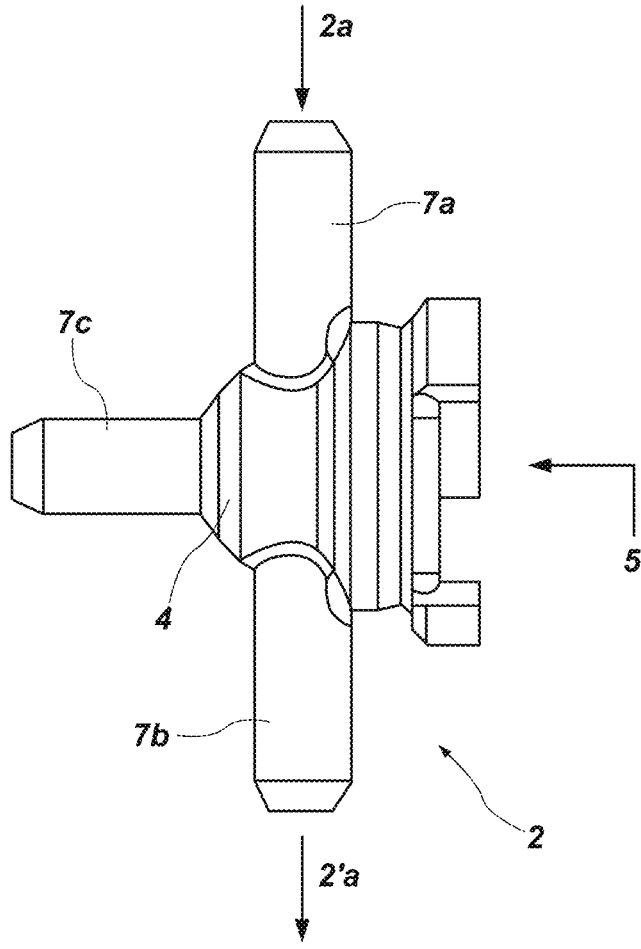
FIG. 2 shows an overall view of the distribution connector of FIG. 1.

As can be seen more clearly in FIG. 2, the distribution connector 2 is formed by a body 4, this body 4 defining a chamber 4a that delimits an internal volume of the distribution connector 2. The chamber 4a has a main opening 5 that, as will be described in further detail in the remainder of this description, is attached to a head of the control valve 3. The chamber 4a also has a bottom that faces the main opening 5 and an internal wall that extends from the bottom of the chamber to the main opening 5 in order to delimit the internal volume of the chamber 4a of the distribution connector 2. One end of the internal wall, therefore, defines the contour of the main opening 5.

A distribution connector 2 according to the disclosure has at least one inlet opening 6 that is arranged in the internal wall of the chamber 4a and provides access to the inlet channel 2a. In the example shown in FIG. 1, the connector 2 has two inlet openings 6, 6' that are arranged across from one another on the wall of the chamber. The first inlet opening 6 allows the fluid coming from the inlet channel 2a to flow into the chamber 4a and to fill it via a first section of the inlet duct 7a. The second inlet opening 6' allows the fluid to exit from the chamber 4a via a second section of the inlet duct 7b at inlet channel 2'a (FIG. 2). In the example of the distribution connector 2 that is shown in FIG. 1, the fluid can, therefore, fill the free space of the chamber 4a, and flow freely in a fluid distribution line through the distribution connector 2. The fluid can be selectively diverted to the outlet channel 2b. Other configurations of the distribution connector 2 are also possible, as will be described later in detail.

In any case, and regardless of the configuration of the distribution connector 2 that is selected, the latter has an outlet opening 8 that is arranged at the bottom of the chamber 4a and opens here into a third section of the duct 7c, the free end of which defines the outlet channel 2b.

The control valve 3 is formed by a valve head closing a valve body. As is clearly visible in FIG. 1, the contour of the main opening 5 of the distribution connector 2 bears against the valve head. The valve head defines a fluid inlet passage 9, the fluid inlet passage 9 opening into an enclosure 11 of the valve body. It also defines a tubular fluid outlet duct 10, one end of which also opens into the enclosure 11. The tubular fluid outlet duct 10 extends longitudinally from its end opening into the enclosure to a second end, that is to say, its free end.

The valve body comprises the enclosure 11 provided with a plug 12, here a diaphragm. The plug 12 is selectively controlled so as to close and open the outlet end of the tubular fluid outlet duct 10. In this way, it is possible to allow the fluid to flow from the fluid inlet passage 9 into the tubular fluid outlet duct 10 or to block this flow. The valve head bearing on the valve body makes it possible to retain the plug 12 and to delimit the enclosure 11. As is inherently well known, the actuation of the plug 12 between its position opening or closing the flow of fluid in the control valve 3 can be achieved by a piston 13, one end of which is in contact with the plug 12. The piston 13 can be moved through application of an electromagnetic force that is generated by a coil 14, optionally in combination with a spring 15. The control valve 3 also has an electrical interface 16, here in the form of a connector that enables it to be connected to a control member (not shown). The control member emits electrical signals aimed at energizing the coil 14 and thus controlling the open or closed state of the valve. As will be readily understood, the disclosure is in no way limited to a control valve comprising the elements for actuating the plug 12 that have just been described, and any arrangement that allows the control member to selectively actuate the plug 12 between its open and closed position may be suitable. In particular, the piston 13 and the plug 12 can be arranged in a very different way than that presented by way of example in the figure. Provision may, in particular, be made for the piston 13 not to be perfectly positioned in alignment with the tubular fluid outlet duct 10 and, for example, to extend to present an angle of up to 10° or 20° with the general direction of the tubular fluid outlet duct 10.

Returning to the general description of the fluid distribution element 1 in FIG. 1, the distribution connector 2 is kept attached to the control valve, for example, by clipping or by any other technical means that enable the distribution connector 2 to be secured to the control valve 3. The distribution connector 2 is attached to the head of the control valve 3 by moving it in a general direction represented by the arrow D in FIG. 1. More precisely, the main opening 5 of the chamber 4a is attached to the head of the control valve 3, this head carrying the fluid inlet passage 9 and the tubular fluid outlet duct 10. In the example shown in FIG. 1, the valve head has a main part 3b in which the fluid inlet passage 9 is arranged, this passage being traversed by the tubular fluid outlet duct 10. This main part 3*b* of the valve head is conformed to the main opening 4*a* of the connector.

The tubular fluid outlet duct 10 extends longitudinally, between its outlet end and its free end, in the assembly direction D, and the main opening 5 faces the outlet opening 8 that is made in the bottom of the chamber 4*a* of the distribution connector 2. This arrangement makes it possible, during the assembly of the distribution connector 2 to the control valve 3, to connect the free end of the tubular fluid outlet duct 10 to the outlet opening 8 of the distribution connector 2 and thus to fluidly connect the tubular fluid outlet duct 10 to the outlet channel 2*b* of the fluid distribution element 1. The tubular outlet duct, therefore, has a length allowing its free end to contact the bottom of the chamber 4*a*. The fluid inlet passage 9 of the control valve 3, in turn, is in fluid communication with the internal volume of the chamber 4*a*.

The body 4 of the distribution connector 2 and, more particularly, the chamber 4*a* of this body 4, is shaped like the valve head, so that when they are suitably attached to one another, the tubular fluid outlet duct 10 of the control valve 3 is connected to the outlet opening 8 of the distribution connector 2; and so that the fluid inlet passage 9 of the control valve 3 opens into the internal space of the chamber 4*a*.

It is noted that the internal volume of the chamber 4*a* is sufficiently large that the tubular fluid outlet duct 10 does not completely fill it. The fluid can thus enter the chamber 4*a* via the inlet opening 6 and fill the internal volume that remains free. The fluid is able to flow to the fluid inlet passage 9 of the control valve 3 in order to fill the enclosure 11 and also to flow through the second opening 6', which is arranged on the wall of the chamber 4*a* when this second opening 6' is present.

It should also be noted that this arrangement makes it possible to set up the fluid distribution element 1 in a single step of assembling the distribution connector 2 on the control valve 3, whereas conventionally the connection of the valve to the rest of the distribution line requires the successive joining of a first duct of the line to an inlet of the control valve and a second duct of the line to an outlet of the control valve. Apart from its ease of use, a distribution element according to the present disclosure provides a particularly compact solution that requires few parts.

During operation of the distribution element of FIG. 1, a fluid flowing in the distribution line is brought to the inlet channel 2*a* of the distribution connector 2 and circulates freely through the first section of inlet duct 7*a*, the chamber 4*a*, and the second section of inlet duct 7*b*. The internal space of the chamber 4*a* that is not occupied by the tubular fluid outlet duct 10 is thus filled with this fluid, just like the enclosure 11 of the control valve, this enclosure being in fluid communication with the chamber 4*a* through the fluid inlet passage 9. Depending on the state-open or closed—of the plug 12, the fluid from the enclosure 11 may or may not flow into the tubular fluid outlet duct 10, and the fluid filling the chamber 4*a* may or may not be diverted to the outlet channel 2*b* of the distribution connector 2 in order to join another duct of the distribution line.

In order to enable the fluid-tight connection between the distribution connector 2 and the control valve 3 to be achieved, the body 4 of the connector has an internal shoulder 4*b* on the side of the main opening 5. A seal has been disposed in the space that is cleared by the internal shoulder 4*b*, making it possible to make the connection between the distribution connector 2 and the control valve 3 waterproof/hermetic.

Similarly, a groove has been made in the internal wall of the chamber 4*a* on the side of the bottom of the chamber in which a second seal has been placed, providing a tight connection between the tubular fluid outlet duct 10 and the outlet opening 8 of the chamber 4*a*. This prevents the fluid filling the chamber 4*a* from escaping directly through the outlet opening 8.

Figure 3:
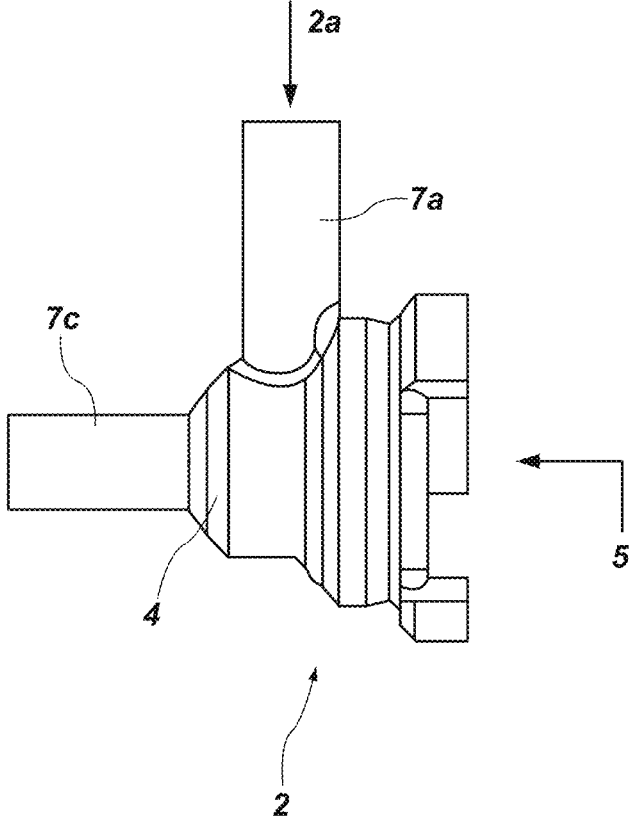
FIG. 3 shows an overall view of the end-of-line connector.

The distribution connector 2 can take another form or include functions other than those presented with reference to FIGS. 1 and 2. Thus, and with reference to FIG. 3, the connector can be an end-of-line connector, in which case it has only one inlet opening 6 allowing the supply of fluid from the inlet channel of the connector.

Furthermore, the duct sections 7*a*, 7*b*, 7*c* connected to the inlet openings 6, 6' and outlet 8 openings, the free ends of which constitute the inlet and outlet channels in FIG. 1, are not essential elements of a connector according to the disclosure. In particular, parts other than duct sections can be provided in order to connect an opening to a channel. The distribution connector 2 can be clipped or welded onto the control valve 3, and may comprise a rapid fluidic connector constituting an inlet and/or outlet channel, making it possible to easily connect a duct from the distribution line to a fluid distribution element 1 according to the disclosure.

Figure 4:
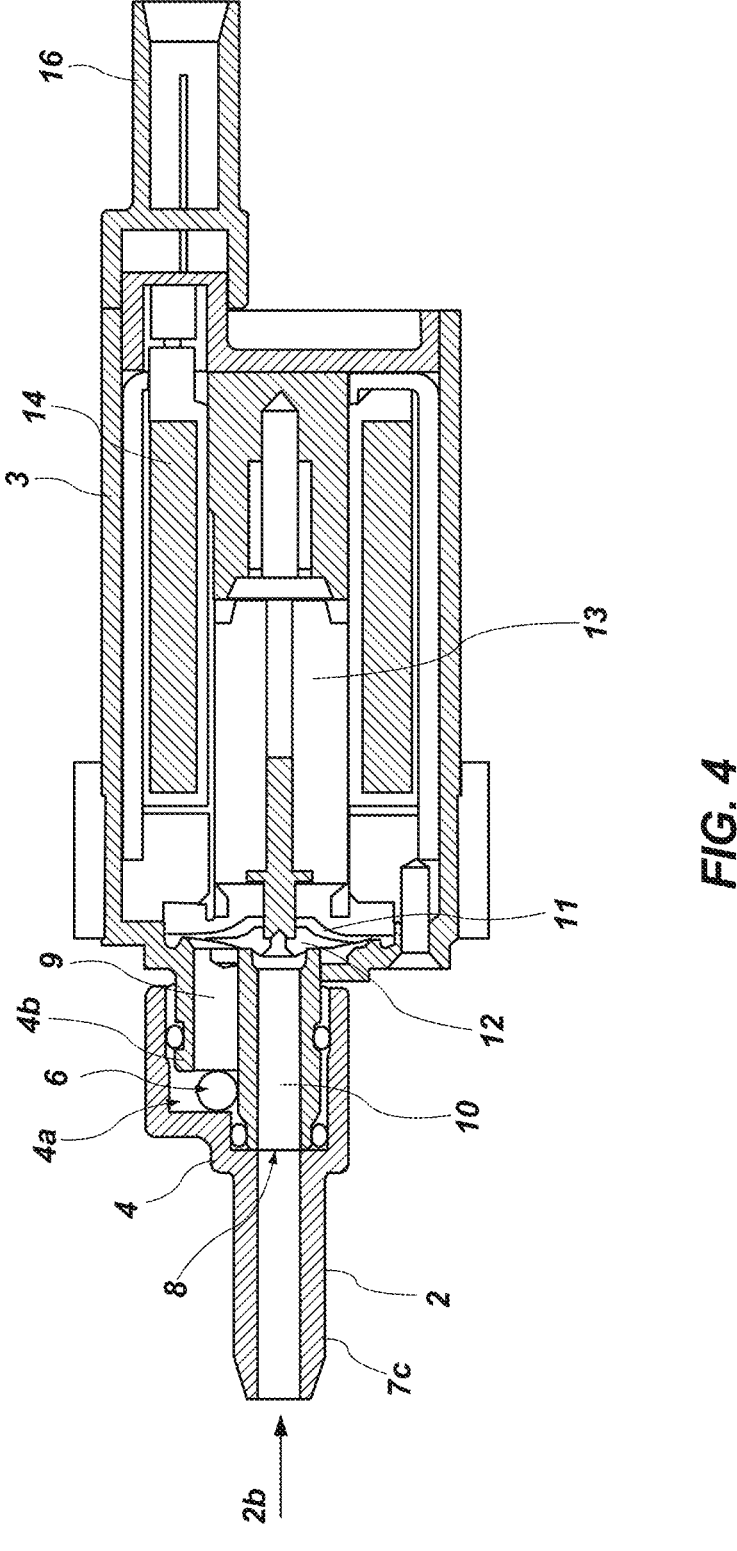
FIG. 4 shows another example of a fluid distribution element according to the present disclosure.

FIG. 4 shows another example of a fluid distribution element 1 according to the disclosure. In this example, the fluid inlet passage 9 of the control valve 3 comprises a duct that extends parallel to the tubular outlet duct 10, the two ducts being disposed one next to the other. In the example of FIG. 2, the distribution connector 2 is an end-of-line connector similar to that shown in FIG. 3.

As will be readily understood, the disclosure is not limited to the embodiment and examples described, and it is possible to add variants thereto without departing from the scope of the invention as defined by the claims.

It can, in particular, find applications apart from cleaning devices and systems for vehicles, as was given by way of illustration in the introduction to this application, such as, for example, in the field of fluid distribution in buildings.

The invention claimed is:

1. A fluid distribution element, comprising:
   a. a control valve formed by a valve head closing a valve body:
      the valve head alone defining a fluid inlet passage and a tubular fluid outlet duct, the fluid inlet passage and the tubular fluid outlet duct, respectively, having ends that open into an enclosure of the valve body; and
      the valve body comprising a plug that is disposed in the enclosure, the plug being configured so as to selectively close and open an outlet end of the tubular fluid outlet duct; and
   b. a distribution connector for distributing the fluid from at least one inlet channel to an outlet channel, the distribution connector being attached to the valve head and comprising a main body that defines a chamber, the chamber having:
      a main opening that is traversed by the fluid inlet passage and the tubular fluid outlet duct of the valve head;
      a bottom that faces the main opening;
      a wall extending from the bottom of the chamber to the main opening;

at least one inlet opening that is formed in the wall of the chamber to provide access to the at least one inlet channel; and an outlet opening that is formed in the bottom of the chamber and connects one end of the tubular fluid outlet duct to the outlet channel of the connector.

2. The fluid distribution element of claim 1, wherein the tubular fluid outlet duct is disposed next to the fluid inlet passage.

3. The fluid distribution element of claim 1, wherein the fluid inlet passage is formed by a duct that is disposed adjacent to the tubular fluid outlet duct.

4. The fluid distribution element of claim 1, wherein the distribution connector comprises a first seal that is disposed in the chamber to seal a connection between the distribution connector and the control valve.

5. The fluid distribution element of claim 4, wherein an internal wall of the chamber comprises, on a side of the bottom of the chamber, a groove in which a second seal resides, providing a tight connection between the tubular fluid outlet duct and the outlet opening.

6. The fluid distribution element of claim 1, wherein the distribution connector comprises two inlet openings.

7. The fluid distribution element of claim 1, wherein the inlet opening and the outlet opening of the distribution connector respectively open into two duct sections, free ends of which respectively define the at least one inlet channel and the outlet channel of the distribution connector.

8. The fluid distribution element of claim 1, wherein the distribution connector comprises means for joining to the valve head.

9. The fluid distribution element of claim 2, wherein the distribution connector comprises a first seal that is disposed in the chamber to seal a connection between the distribution connector and the control valve.

10. The fluid distribution element of claim 9, wherein an internal wall of the chamber comprises, on a side of the bottom of the chamber, a groove in which a second seal resides, providing a tight connection between the tubular fluid outlet duct and the outlet opening.

11. The fluid distribution element of claim 10, wherein the distribution connector comprises two inlet openings.

12. The fluid distribution element of claim 11, wherein the inlet opening and the outlet opening of the distribution connector respectively open into two duct sections, free ends of which respectively define the at least one inlet channel and the outlet channel of the distribution connector.

13. The fluid distribution element of claim 12, wherein the distribution connector comprises means for joining to the valve head.

14. The fluid distribution element of claim 3, wherein the distribution connector comprises a first seal that is disposed in the chamber to seal a connection between the distribution connector and the control valve.

15. The fluid distribution element of claim 14, wherein an internal wall of the chamber comprises, on a side of the bottom of the chamber, a groove in which a second seal resides, providing a tight connection between the tubular fluid outlet duct and the outlet opening.

16. The fluid distribution element of claim 15, wherein the distribution connector comprises two inlet openings.

17. The fluid distribution element of claim 16, wherein the inlet opening and the outlet opening of the distribution connector respectively open into two duct sections, free ends of which respectively define the at least one inlet channel and the outlet channel of the distribution connector.

18. The fluid distribution element of claim 17, wherein the distribution connector comprises means for joining to the valve head.

19. The fluid distribution element of claim 1, wherein the fluid inlet passage is in fluid communication with an internal volume of the chamber.

20. A connector for distributing a fluid from at least one inlet channel to an outlet channel and configured to be attached to a control valve having a fluid inlet passage and a tubular fluid outlet duct, the connector comprising a main body that defines a chamber, the chamber having:

a main opening for receiving the control valve when the connector is attached to the control valve;

a bottom that faces the main opening;

a wall extending from the bottom of the chamber to the main opening;

at least one inlet opening that is formed in the wall of the chamber to provide access to the at least one inlet channel; and an outlet opening that is formed in the bottom of the chamber to connect one end of the tubular fluid outlet duct to the outlet channel of the connector when the connector is attached to the control valve.

* * * * *